United States Patent
Tresch

(10) Patent No.: US 6,604,890 B2
(45) Date of Patent: Aug. 12, 2003

(54) ANTI-KINK PROTECTIVE DEVICE FOR LINES

(75) Inventor: Rudolf Tresch, Seon (CH)

(73) Assignees: Ka-Te System AG, Freienbach (CH); Reinhard Hecht, Regensburg (CH); Karl Manstorfer, Regensburg (CH)

(*) Notice: Subject to any disclaimer, the term of this patent is extended or adjusted under 35 U.S.C. 154(b) by 0 days.

(21) Appl. No.: 10/082,169

(22) Filed: Feb. 26, 2002

(65) Prior Publication Data

US 2002/0113434 A1 Aug. 22, 2002

Related U.S. Application Data

(63) Continuation of application No. PCT/CH00/00463, filed on Aug. 31, 2000.

(30) Foreign Application Priority Data

Sep. 13, 1999 (EP) .............................................. 99118190

(51) Int. Cl.[7] ................................................. F16L 3/00
(52) U.S. Cl. ................................. 405/184.4; 405/183.5
(58) Field of Search ........................... 405/184.4, 183.5, 405/184, 154.1; 248/291.1; 254/134.3 R, 134.3 FT

(56) References Cited

U.S. PATENT DOCUMENTS 6,116,485 A * 9/2000 Watkins ...................... 224/275
6,531,683 B1 * 3/2003 Lawrence ................. 219/125.1

FOREIGN PATENT DOCUMENTS

| DE | 2001618 A | 7/1971 |
| DE | 7306928 U | 7/1973 |
| DE | 35 15256 A | 11/1986 |
| DE | 297 19 106 U | 1/1998 |
| DE | 298 02 655 U | 4/1998 |
| DE | A-19714212 | 10/1998 |
| EP | 0 583 701 A | 2/1994 |
| EP | A-1008881 | 6/2000 |
| FR | 2782852 A1 * | 3/2000 ............ H02G/1/08 |
| JP | 57081203 | 5/1982 |
| JP | 06 086421 A | 3/1994 |

* cited by examiner

Primary Examiner—Heather Shackelford
Assistant Examiner—Lisa Saldano
(74) Attorney, Agent, or Firm—Oliff & Berridge, PLC.

(57) ABSTRACT

An antikink device that is especially useful in sewage systems for installing pipes (15), in particular light wave guide cables. The device comprises a deflection element (1) that can be secured by a bracket (2) and that deflects pipes (15) arriving from a first direction to a second direction. The bracket (2) comprises a first angular element (4) that can be connected with a second angular element (5) and that includes in a first plane an adjustable angle, and that in turn includes an adjustable angle with a base plate (3) that can be mounted on a supporting surface and a second plane that is at least approximately perpendicular to the first plane, the deflection element (1) being mounted on the second angular element. The bracket (2) can be easily mounted and the deflection element (1) can be easily brought in the desired position and fixed.

18 Claims, 3 Drawing Sheets

ANTI-KINK PROTECTIVE DEVICE FOR LINES

This is a continuation of Application No. PCT/CH00/00463, filed Aug. 31, 2000.

BACKGROUND OF THE INVENTION

1. Field of Invention

The present invention relates to a protective device serving to guide and deflect lines and cables, in particular optical-fiber cables, for example in drainage systems, according to the preamble of claim 1.

2. Description of Related Art

DE-U1-298 02 655 discloses a protective device of this type which is provided for use in the transition region between a manhole and a drainage pipe, opening into the latter, of a drainage or sewage system. It has a deflection element which is designed to be semicircular in one plane, in particular as a half drop shape, and has a groove on its radially outer side for accommodating an optical fiber. A one-piece covering, holding and fastening device covers the groove on the one hand and serves to hold and fasten the deflection element to the wall of the manhole on the other hand. The deflection element is arranged so as to run obliquely upward from the orifice of the drainage pipe into the manhole, and the optical-fiber cable laid in the drainage pipe runs in the manhole in the groove of the deflection element and from the end of the deflection element remote from the drainage pipe approximately rectilinearly to hooks which are fastened to the wall of the manhole. The optical-fiber cable is directed by the hooks in the peripheral direction of the manhole to a next deflection element, via which the optical-fiber cable runs into a further drainage pipe.

The known protective device is therefore firmly mounted in a position which enables the optical-fiber cable to be directed further in an intended direction. If it is found that the direction originally intended was not correct, that the protective device was not mounted with sufficient precision or could not be mounted at all in the desired position for lack of a suitable bearing surface, the hooks in the manhole are to be adapted accordingly, so that no inadmissible bending of the optical-fiber cable occurs. Of course, the bending of the optical-fiber cable in the drainage pipe is to be taken into account and corrected if need be. If the conditions are not optimal, this installation work may therefore turn out to be very expensive.

SUMMARY OF THE INVENTION

It is therefore an object of the present invention to provide a protective device which can be mounted in a simple manner and permits kink-free guidance and deflection of lines and cables, in particular optical-fiber cables.

This object is achieved with a protective device which has the features of claim 1.

Preferred configurations of the protective device are specified in further claims.

The protective device according to the invention consists of a deflection element and a holder which has a first angle element which can be connected in a first plane to a sole plate in such a way as to enclose a selectable angle, it being possible for this sole plate to be mounted on a bearing surface, e.g. on a sewer or manhole wall, and which can be connected in a second plane, disposed at least approximately perpendicularly to the first plane, to a second angle element again in such a way as to enclose a selectable angle, to which second angle element the deflection element is fastened.

After the sole plate has been mounted, the deflection element can therefore be brought into a suitable position by rotating and tilting the two angle elements and can be fixed in this position. If necessary, e.g. when laying an additional cable, the angle elements can be released and fixed again in a corrected position. The orientation of the deflection element can therefore easily be effected or corrected after the sole plate has been mounted.

The invention is explained in more detail with reference to an exemplary embodiment shown in the drawing, in which, in a purely schematic manner:

DETAILED DESCRIPTION OF PREFERRED EMBODIMENTS

Figure 1:
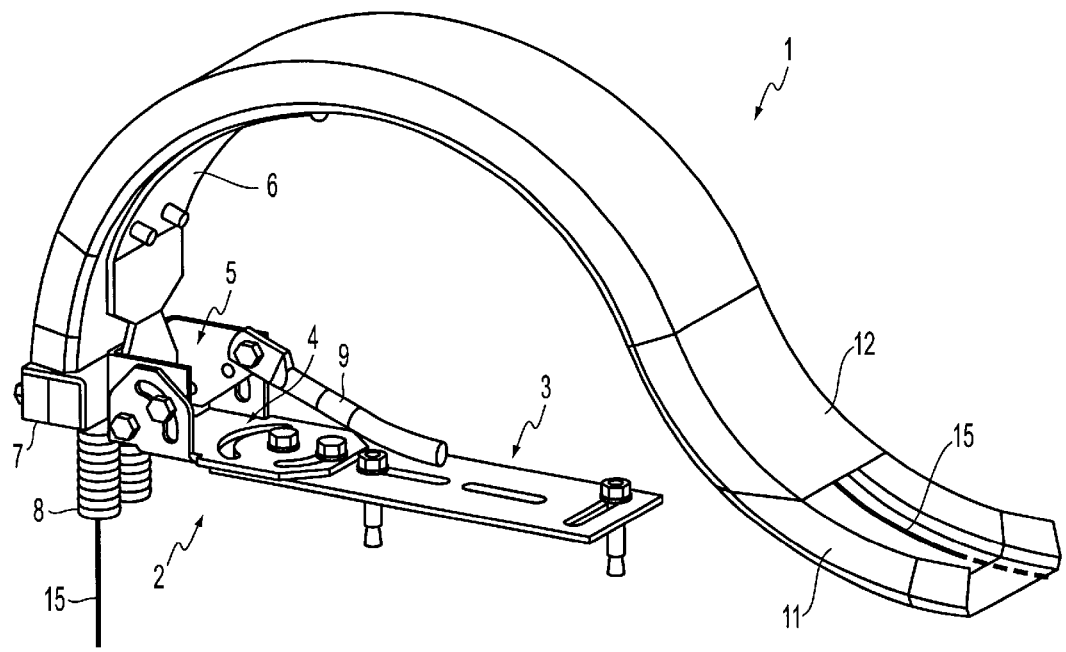
FIG. 1 shows a preferred configuration of the protective device according to the invention with deflection element 1 and holder 2.

FIG. 1 shows a protective device, in particular for lines 15 to be laid in sewage systems, having a deflection element 1 which can be mounted by means of a holder 2 and by means of which lines 15 coming from a first direction can be deflected in a second direction.

Figure 2:
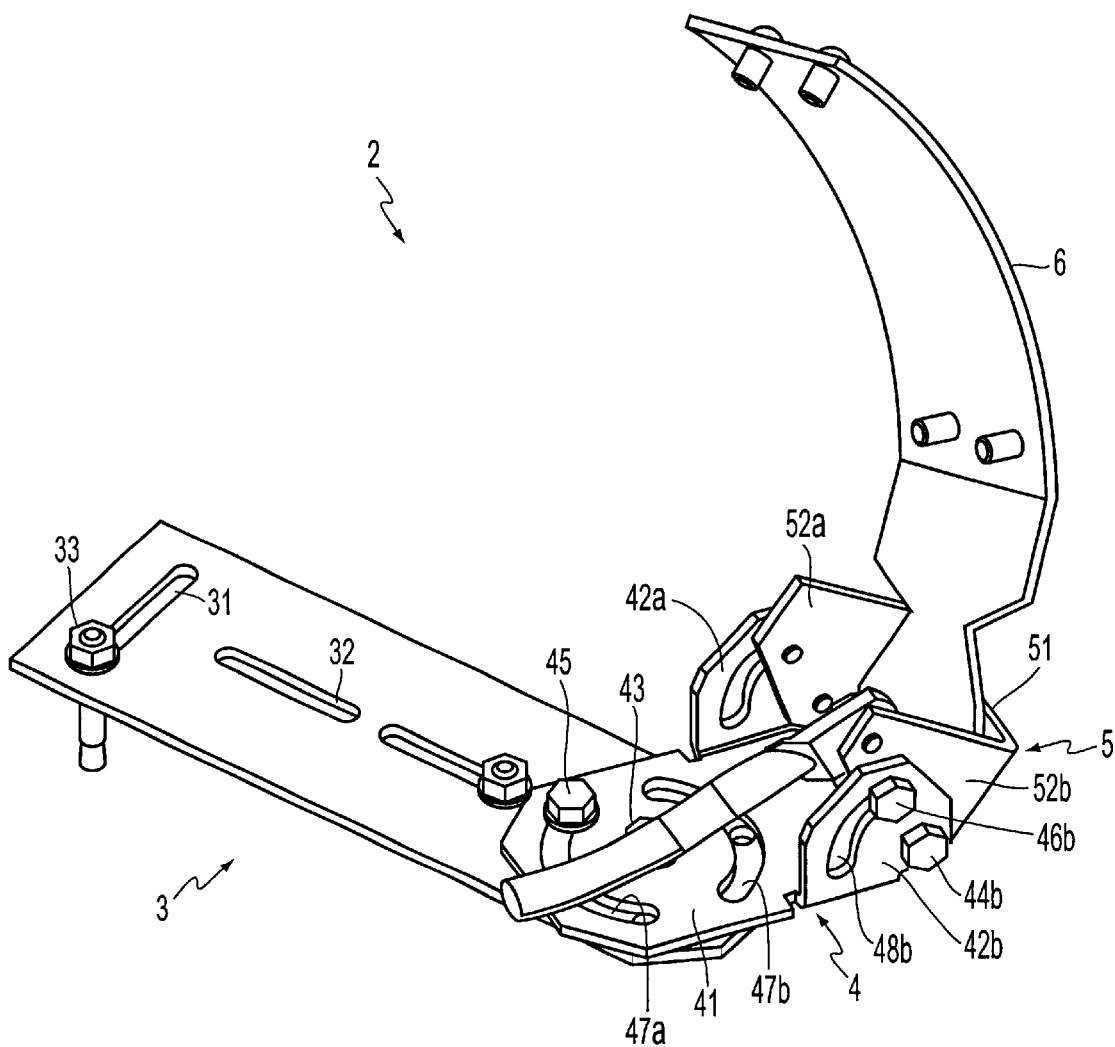
FIG. 2 shows the holder 2 according to FIG. 1 with a sole plate 3, and a first and a second angle element 4 and 5, which are rotated relative to one another into the end positions.
Figure 3:
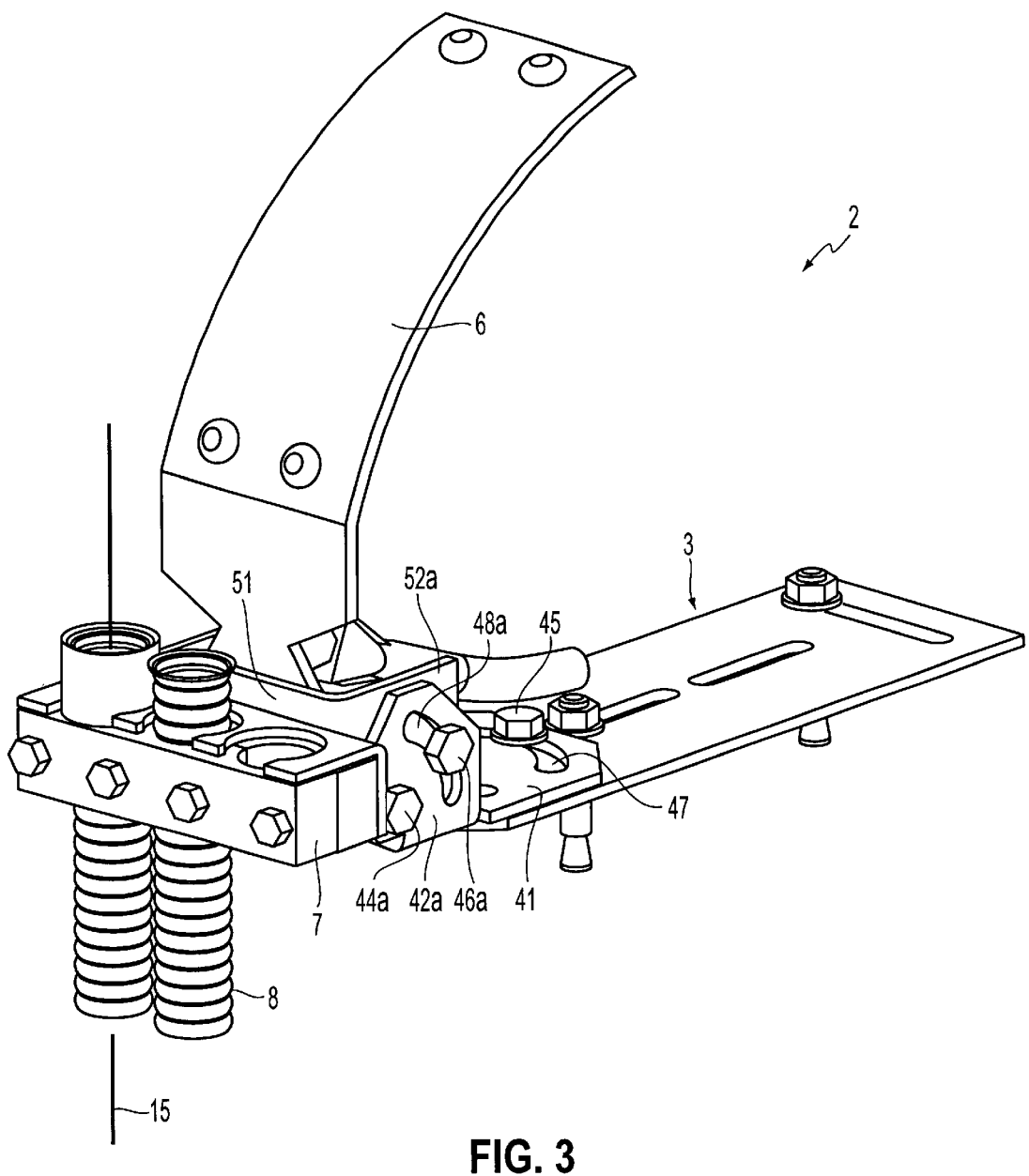
FIG. 3 shows the holder 2 according to FIG. 2 in center position.

The holder 2, which is shown without deflection element 1 in FIG. 2 and FIG. 3, has a sole plate 3, which can be mounted on a bearing surface, e.g. on a sewer or manhole wall, and two angle elements 4, 5 which enable the deflection element 1 to be rotated into a suitable position and tilted. The sole plate 3, which is connected to the first angle element 4, is preferably provided with slots 31, 32 which serve to pass mounting screws 33 through and which enable the sole plate 3 and thus the deflection element 1 to be displaced or rotated into a more favorable position before the mounting screws 33 are tightened.

The first and the second angle element 4, 5 have a base plate 41; 51 and two wing pieces 42a, 42b and 52a, 52b, respectively, which together with the associated base plate 41; 51 form an L-profile or a U-profile. The wing pieces 42a, 42b and 52a, 52b are screwed to one another, so that the angle elements 4 and 5 displaced one inside the other are firmly connected to one another in such a way as to enclose an intended angle.

The sole plate 3 and the base plate 41 of the first angle element 4 are connected to one another by a first screw 43, which forms an axis about which the two plates 3, 41 can be rotated relative to one another, and can be mutually fixed by at least one further screw 45. Provided in the base plate 41 is an aperture, e.g. a hole, for passing the first screw 43 through, and a slot 47a which runs concentrically thereto and inside which the further screw 45 serving for the fixing is guided during the mutual rotation of the two plates 3, 41. A further slot 47b is shown, through which an additional fastening screw can be guided and, like the first and second screws 43 and 45, respectively, can be screwed into a tapped hole provided in the sole plate 3. The sole plate 3 and the base plate 41 can therefore be rotated relative to one another in a first plane by an angle determined by the length of the concentrically running slots 47a, 47b and can be fixed in a desired position.

In a similar manner, the two angle elements 4 and 5 can be displaced relative to one another and fixed in a second plane preferably perpendicular to the first plane. The deflection element 1 can therefore be displaced and rotated in the first plane and tilted or inclined relative to this first plane (rotation in the second plane). To this end, the wing pieces 42a; 42b and 52a; 52b are each connected to one another with a screw 44a; 44b, these screws forming an axis about which the two angle elements 4, 5 can be rotated relative to one another, and can be mutually fixed by at least one further screw 46a; 46b.

Provided in each of the wing pieces 42a; 42b of the first angle element 4 is a hole for passing a first screw 44a; 44b through and a slot 48a; 48b which runs concentrically thereto and inside which the further screw 46a; 46b serving for the fixing is guided during a mutual rotation of the two angle elements 4, 5. The screws 44a; 44b and 46a; 46b, which are guided by holes and slots 48a; 48b in the wing pieces 42a; 42b of the first angle element 4, are screwed into tapped holes, corresponding thereto, in the wing pieces 52a; 52b of the second angle element 5. The two angle elements 4 and 5 can therefore be rotated relative one another in the second plane by an angle determined by the length of the concentrically running slots 48a, 48b and can be fixed in a desired position. It is shown in FIG. 1 and FIG. 2 that the wing pieces 42a, 42b of the first angle element 4 enclose the wing pieces 52a, 52b of the second angle element 5 from outside. Of course, the measures described for connecting the two angle elements 4, 5 may also be transposed (wing pieces 42a, 42b on the inside).

The deflection element 1 may now be connected to the second angle element 5 directly or, as shown in FIGS. 1 and 2, via a supporting yoke 6. The second angle element 5 may also be formed in an extension in accordance with the form of the supporting yoke 6. The supporting yoke 6 preferably has a certain elasticity, which prevents sudden tensile forces, in particular in the region of the bending zones, from being able to cause deformations at the lines 15.

The second angle element 5, as shown in FIG. 3, is preferably connected to a mounting block 7, to which the lines 15 or guide tubes 8 provided for the lines 15 can be fastened. In this case, the mounting block 7 provides protected access to the deflection element 1. The lines 15 can also be held by the mounting block 7, so that pulling movements are absorbed by the holder 2 and not by the deflected line 15.

The deflection element 1 has an inner guide element 11 in which a line 15 coming from a first direction is deflected in a second direction. The deflection element 1 preferably also has a cover 12, which together with the inner guide element 11 forms a cable duct, inside which the deflected lines 15 run in a protected manner.

The inner guide element 11 and the outer guide element 12 corresponding thereto preferably have a drop-shaped profile. According to respective requirements, other profiles may also be selected. The protective device according to the invention may of course be used for any desired electrical or optical lines 15, but also for liquid lines.

Since potential differences may occur which are disturbing over longer distances, adjacent holders 2 are preferably connected to an electrical cable 9, by means of which equipotential bonding is effected. As a result, data transmission errors which are caused by potential differences, and the cause of which can normally hardly be determined, can be avoided.

The holder 2 and the deflection element 1 are preferably made of corrosion-resistant materials. Suitable materials are, for example, plastics which have the requisite strength, stainless steel or galvanized metals.

As described above, screws 45, 46a and 46b are provided for the mutual fixing of the sole plate 3 and of the angle elements 4, 5 and thus of the deflection element 1. However, it is also possible to fix the deflection element 1 directly with a screw which is preferably screwed into the bearing surface, e.g. a sewer wall, at that end of the deflection element 1 which is remote from the holder 2, e.g. by a flange.

What is claimed is:

1. A protective device for lines to be laid in sewage systems, comprising:
    a holder, the holder including a sole plate that can be mounted on a bearing surface, a first angle element connected to the sole plate in a rotatable manner about a first axis and a second angle element connected to the first angle element in a rotatable manner about a second axis;
    a deflection element, the deflection element being fastened to the second angle element and having a drop-shaped profile to deflect lines coming from a first direction in a second direction; and
    a mounting block for fastening the lines or guide tubes provided for the lines, the mounting block being connected to the second angle element.

2. The protective device as claimed in claim 1, characterized in that at least one of the first and the second angle elements have a base plate and at least one wing piece, which together with the base plate form an L-profile in which the at least one wing piece of the at least one of the first and second angle elements can be connected to one another in such a way as to enclose a selectable angle.

3. The protective device as claimed in claim 2, characterized in that the sole plate and the base plate of the first angle element are mutually rotatable about a first screw forming the first axis, and the at least one wing piece of the first and second angle elements are mutually rotatable about at least one second screw forming the second axis.

4. The protective device as claimed in claim 3, characterized in that the first and second angle elements and at least one of the base plate and the deflection element can be fixed by at least one further screw.

5. The protective device as claimed in claim 4, characterized in that the base plate and the wing piece of the first angle element have an aperture for passing through the first and the second screw, respectively, and, concentrically thereto, at least one slot through which the further screws pass.

6. The protective device as claimed in claim 3, characterized in that the first and second axes are at a right angle to each other.

7. The protective device as claimed in claim 1, characterized in that at least the first and the second angle elements have a base plate and at least two wing pieces, which together with the base plate form an U-profile in which the wing pieces of the at least one of first and second angle elements can be connected to one another in such a way as to enclose a selectable angle.

8. The protective device as claimed in claim 7, characterized in that the sole plate and the base plate of the first angle element are mutually rotatable about a first screw forming the first axis, and the wing pieces of the first and second angle elements are mutually rotatable about at least one second screw forming the second axis.

9. The protective device as claimed in claim 8, characterized in that the first and second angle elements and at least one of the base plate and the deflection element can be fixed by at least one further screw.

10. The protective device as claimed in claim 9, characterized in that the base plate and the wing pieces of the first angle element have an aperture for passing through the first and the second screw, respectively, and, concentrically thereto, at least one slot through which the further screws pass.

11. The protective device as claimed in claim 8, characterized in that the first and second axes are at a right angle to each other.

12. The protective device as claimed in claim 1, characterized in that the second angle element is directly connected to the deflection element.

13. The protective device as claimed in one of claim 1, characterized in that the second angle element is connected to the deflection element via a firm supporting yoke.

14. The protective device as claimed in claim 1, characterized in that the deflection element comprises a guide element serving to accommodate the lines and having the drop-shaped profile.

15. The protective device as claimed in claim 14, characterized in that the guide element and a cover form a duct for the lines.

16. The protective device as claimed in claim 1, characterized in that the sole plate is provided with slots which preferably run in the longitudinal direction and transversely thereto and serve to pass mounting screws through.

17. The protective device as claimed in claim 1, characterized in that a cable is capable of being connected to the holder, so that at least two protective devices can be connected to one another for the purpose of equipotential bonding.

18. The protective device as claimed in claim 1, characterized in that at least one of the holder and deflection element is at least partly produced from a corrosion-resistant material.

* * * * *